United States Patent
Giladi et al.

(10) Patent No.: US 12,028,397 B2
(45) Date of Patent: Jul. 2, 2024

(54) BANDWIDTH REDUCTION THROUGH DURATION AVERAGING

(71) Applicant: Comcast Cable Communications, LLC, Philadelphia, PA (US)

(72) Inventors: Alexander Giladi, Princeton, NJ (US); Yasser Syed, La Crescenta, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 351 days.

(21) Appl. No.: 15/689,847

(22) Filed: Aug. 29, 2017

(65) Prior Publication Data

US 2019/0068673 A1 Feb. 28, 2019

(51) Int. Cl.
| | |
|---|---|
| *H04L 65/75* | (2022.01) |
| *H04L 43/0876* | (2022.01) |
| *H04L 43/16* | (2022.01) |
| *H04L 65/61* | (2022.01) |
| *H04L 67/02* | (2022.01) |
| *H04N 21/2343* | (2011.01) |
| *H04N 21/262* | (2011.01) |
| *H04N 21/845* | (2011.01) |

(52) U.S. Cl.
CPC ........ *H04L 65/762* (2022.05); *H04L 43/0876* (2013.01); *H04L 43/16* (2013.01); *H04N 21/23439* (2013.01); *H04N 21/26258* (2013.01); *H04N 21/8456* (2013.01); *H04L 65/61* (2022.05); *H04L 67/02* (2013.01)

(58) Field of Classification Search
CPC ... H04L 65/762; H04L 43/0876; H04L 43/16; H04N 21/23439

USPC ......................................................... 709/219
See application file for complete search history.

(56) References Cited

U.S. PATENT DOCUMENTS

| | | | |
|---|---|---|---|
| 2015/0100703 A1 | 4/2015 | Begen et al. | |
| 2015/0163273 A1* | 6/2015 | Radcliffe | H04L 43/0894 709/231 |
| 2015/0288736 A1 | 10/2015 | Caulfield et al. | |
| 2015/0296274 A1* | 10/2015 | Good | H04N 21/8456 725/93 |

(Continued)

FOREIGN PATENT DOCUMENTS

| | | |
|---|---|---|
| EP | 2945339 A1 | 11/2015 |
| WO | WO-2010/111261 A1 | 9/2010 |
| WO | WO-2014/187490 A1 | 11/2014 |

OTHER PUBLICATIONS

European Search Report dated Oct. 4, 2018 by the European Patent Office for EP Application No. 18191414.4, filed on Aug. 29, 2018 (Applicant—Comcast Cable Communications, LLC) (10 Pages).

(Continued)

*Primary Examiner* — Hermon Asres
(74) *Attorney, Agent, or Firm* — Ballard Spahr LLP

(57) ABSTRACT

Disclosed are systems and methods for bandwidth reduction through duration averaging. An average duration of content segments can be determined. When the average segment duration exceeds a first threshold or falls below a second threshold, content segments can be encoded at new segment durations until the average segment duration falls below the first threshold and above the second threshold. When the average segment duration exceeds a first threshold or falls below a second threshold, an updated manifest including a modified segment duration parameter can be generated.

26 Claims, 6 Drawing Sheets

(56) References Cited

U.S. PATENT DOCUMENTS

| | | |
|---|---|---|
| 2015/0373074 A1 | 12/2015 | Lohmar et al. |
| 2016/0072637 A1* | 3/2016 | Gholmieh .......... H04L 12/1881 709/219 |
| 2016/0127440 A1* | 5/2016 | Gordon .................. H04L 65/80 709/219 |
| 2019/0036986 A1* | 1/2019 | Sathyanarayana .... H04L 65/762 |

OTHER PUBLICATIONS

Office Action issued in European Application No. 18191414.4, dated Nov. 15, 2019, 7 pages.
Office Action issued in European Patent Application No. 18 191 414.4-1209, dated Nov. 16, 2021, 5 pages.

* cited by examiner

BANDWIDTH REDUCTION THROUGH DURATION AVERAGING

BACKGROUND

Content streaming services can provide manifests such as Media Presentation Description (MPD) documents to user devices. The user devices can determine information to facilitate receipt of a stream based on the manifests, such as timing information or Uniform Resource Locators (URLs) to which requests should be sent. User devices that frequently require updated manifests result in increased network traffic due to an increased frequency of transmission of new manifests or updates to existing manifests. These and other shortcomings are addressed herein.

SUMMARY

It is to be understood that both the following general description and the following detailed description are exemplary and explanatory only and are not restrictive. In one aspect, provided are methods and systems for bandwidth reduction through averaging the duration of content segments. Content streams can be divided into content segments for streaming to user devices. A manifest can be generated that comprises one or more URLs or other resource identifiers at which the content segments can be found. User devices can request particular content segments by transmitting a request to the URL or other resource identifier indicated in the manifest. Template-based manifest schemes differ from schemes where each segment is listed in a manifest by providing a manifest based upon content segments that are of a defined constant duration. The defined constant duration is described in a segment duration parameter of the manifest. Using the segment duration parameter, a user device can dynamically determine parameters (e.g., a segment index or a time code in the content stream) for a request by assuming that the content segments conform to the defined constant duration described in the segment duration parameter. A user device can still request specific content segments based upon template based manifests so long as 1) a real content segment does not exceed +/−50% of the defined Template defined segment duration and 2) the requested real content segment does not slip out in time more than +/−50% of the Template defined segment duration, If these restrictions are exceeded, then a new period can be created in the manifest and the user device can receive the updated manifest. This can be done, for example, by periodically sending an updated manifest, or an update to an existing manifest, that can be periodically retrieved by the user devices. This approach can occur periodically even if the update has no changes, but the update frequency can be determined to handle the maximum rate of change in successive segment durations. This can cause additional heavy traffic burdens to support this manifest update approach scaled across a network of user devices.

An average duration of content segments of a content stream can be maintained. Maintaining the average duration of content segments can be performed by a packager that generates manifests for the content stream. The packager can receive content segments for a transcoder and update the average duration based on the duration of the received content segments. If the average duration exceeds a first threshold based on a segment duration parameter of a manifest, or if the average duration falls below a second threshold based on the segment duration parameter of the manifest, the packager can generate a new manifest or an update to an existing manifest including a modified segment duration based on the average duration. When the user device requests a manifest update, the new manifest or manifest update including the modified segment duration parameter can be transmitted to the user device.

In another example, the average duration of segments of a content stream can be maintained by a transcoder generating one or more segments for transmission to the packager. The transcoder can update the average duration based on the actual duration of the generated content segments. If the average duration exceeds a first threshold based on a segment duration parameter of a manifest, or if the average duration falls below a second threshold based on the segment duration parameter of the manifest, the transcoder can modify the durations at which content segments are subsequently encoded. Thus, the transcoder can force the average segment duration to fall below the first threshold or above the second threshold by encoding content segments at a reduced or increased duration, respectively. This will allow content segments to conform to a current manifest without needing to alter a segment duration parameter of the manifest.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
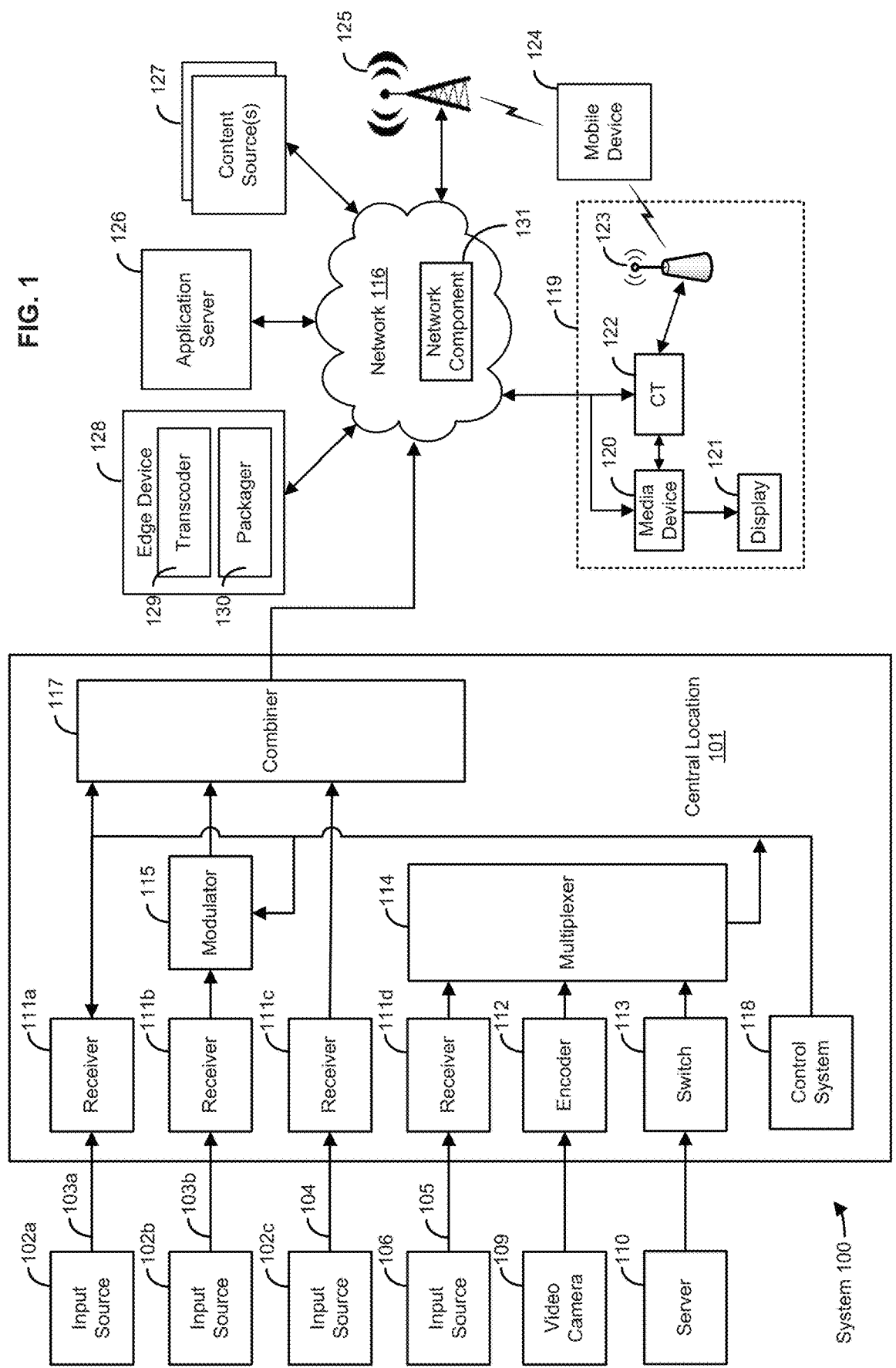
FIG. 1 is a diagram of an example content distribution network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for perforating the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, AVC, H.264, HEVC, H.265, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, FIEVC, AC3, AC4, HE-ACC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to bandwidth reduction in content streams through content segment duration averaging. Content items for streaming can be broken into content segments. User devices of content streams use manifests, e.g. Media Presentation Description (MPD) documents, to derive information (such as URLs and timing information) in order to request content segments of a content stream. The content segments can be requested by a content segment-specific identifier (e.g., an index or other sequential identifier) or by a time value relative to the content stream.

If a manifest lists each content segment, the resulting manifest can be very large. Moreover, as URLs and timing information for content streams are dynamically generated, user devices may require new manifests or updates to existing manifest to reflect changes in the URLs and timing information. This results in increased network traffic due to the growing manifest size and frequency of updates.

Identifiers of content segments can follow a predictable naming convention (e.g., segment_0001.ts, segment_0002.ts, etc.) with the duration of each content segment being constant. This allows for streaming approaches to implement manifest templates. Manifest templates can utilize a naming convention and a segment duration parameter that indicates content segment duration. Using the naming convention and the segment duration parameter, a user device can dynamically generate requests for content segments using a time code based on the segment duration parameter without necessitating a listing for each content segment in the manifest.

However, content segment durations can vary from the segment duration parameter. This can be due to decisions made by an encoder or transcoder to prolong or shorten a segment, or due to the need to avoid drift between audio and video segments. This variation in content segment duration can break predictability on behalf of the user device. In order to restore effective predictability on behalf of the user device, an updated manifest or an update to a stored manifest can be transmitted to the user device. The user device will then generate requests based on an updated segment duration parameter and/or an updated time code reference used to generate requests. If the variations in content segment durations require frequent manifest updates, overall network traffic is increased due to the frequency of such updates. These and other shortcomings area addressed by the approaches described herein.

FIG. 1 illustrates various aspects of an example system in which the present methods and systems can operate, Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programing, and the like) from multiple sources. The central location 101 can combine the content from the various sources and can distribute the content to user (e.g., subscriber) locations (e.g., location 119) via a distribution system 116.

The central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 teed. A switch 113 can provide access to the server 110, which can be a Pay-Per-View server, a data server, an hamlet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a. content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can comprise a transcoder 129 configured to encode content, such as content segments, for delivery to a user device. The edge device 128 can also comprise a packager 130 configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The user device can request content segments based on a manifest received from the packager 130. The user device can generate a request based on a segment duration parameter in the manifest. For example, the user device can assume that all content segments received will conform to a segment duration parameter indicated in the manifest. The user device can then use the segment duration parameter to dynamically generate a request for a given content segment according to its corresponding a time value. However, the actual durations of content segments may vary from the segment duration parameter. The variation of an actual content segment timeline from a predicted content segment timeline is hereinafter referred to as a "slip." For example, a user device can predict a timeline start point for a content segment having index N as N*(segment_duration_parameter), where "segment_duration_parameter" is the segment duration parameter of a manifest stored by the user device. Due to varying durations in content segments, a content segment index N may actually begin at a timeline start point offset from the predicted start point by the "slip." A predictive approach using manifest templates can still function as long as the content segment duration stays within a threshold (e.g., +/−50%) of the segment duration parameter, and slip stays below a threshold, such as less than 50% of the segment duration parameter. If either the content segment duration or the slip exceeds these respective thresholds, the user device can no longer use a manifest in its current state. The user device must then request a new manifest, or an update to a stored manifest, collectively referred to as a manifest update. The manifest update can include, for example, an index value, timeline point, and/or segment duration parameter from which future requests can be generated.

The systems and methods disclosed herein address the excessive amount of manifest traffic due to the causes set forth above. The packager 130 can receive encoded content segments for a content stream from a transcoder 129. The packager 130 can then generate manifests and/or manifest updates for the content stream based on the received encoded content segments. The packager 130 can maintain an average segment duration of the received encoded content segments. Although referred to herein as an average segment duration, it is understood that other aggregate segment durations can also be maintained, such as a means-squared segment duration, a windowed average segment duration, or other value calculated by applying an aggregate function to one or more segment durations. Additionally, although steps or actions are described as being performed by a packager 130, it is understood that the steps or actions can be performed by another computing device.

The packager 130 can determine if the average segment duration exceeds a first threshold value. The packager can determine if the average segment duration falls below a second threshold value. The first threshold value and/or the second threshold value can be based on a segment duration parameter of a manifest, such as a manifest stored by a user device of the content stream. When the average segment duration exceeds the first threshold value, or when the average segment duration falls below the second threshold value, the packager 130 can determine a modified segment duration parameter.

A minimum segment duration and a maximum segment duration for the received content segments can be determined and/or maintained. Determining the modified segment duration parameter can comprise determining the modified segment duration parameter such that the following equation is satisfied:

$$S_1 * SD_{new} < SD_{min} < SD_{max} < S_2 * SD_{new}$$

where $S_1$ is a lower bound scalar (e.g., 0.5), $S_2$ is an upper bound scalar (e.g., 1.5), $SD_{min}$ is a minimum segment duration for received content segments, $SD_{max}$ is a maximum segment duration for received content segments, and $SD_{new}$ is the modified segment duration parameter.

The packager 130 can transmit the modified segment duration parameter, for example, to the user device. Transmitting the modified segment duration parameter can include generating a manifest comprising the modified segment duration parameter as a template element and transmitting the generated manifest to the user device. In another aspect, transmitting the modified segment duration parameter can include generating a manifest update comprising a delta or change to be applied to a manifest stored on the user device. For example, the manifest update can comprise an update to a manifest template stored on the user device. The packager 130 can then transmit the manifest update to the user device. By transmitting updates for manifests, rather than complete updated manifests, the packager 130 saves network bandwidth that would otherwise be used for transmitting additional manifests to a user device.

If the modified segment duration parameter $SD_{new}$ cannot be calculated to satisfy the above equation, the packager 130 can generate a manifest comprising a new entry, thereby effectively restarting the average segment duration calculation. The new entry can include a segment element or period element. The segment element or period element can include a time value upon which future requests for content segments are calculated. For example, the time value can include a baseline time value incremented one or more times by the segment duration parameter to generate a timeline point for a requested content segment. The manifest can then be transmitted to a user device by the packager 130.

The manifest or manifest update can be transmitted as a response to a request for a manifest or manifest update received from the user device. Alternatively, the manifest or manifest update can be transmitted by a server push or other transmission approach without receiving a request.

As discussed herein, a transcoder 129 can encode content segments of a content stream for transmission to a packager 130. For example, the transcoder 129 can receive content from a content source and then encode a portion of the content into one or more content segments. For example, the transcoder 129 can encode a plurality of content segments each corresponding to a same portion of content (e.g., the same two seconds of content), with each content segment varying according to a format, a bitrate, an encoding scheme, a language, other parameter, and/or a combination thereof, thus facilitating variable bitrate streaming for the content.

The transcoder 129 can maintain the average segment duration for content segments encoded by the transcoder 129. The content segments can be encoded based on a first segment duration parameter. The transcoder 129 can determine if the average segment duration exceeds a first threshold. The transcoder 129 can determine if the average segment duration falls below a second threshold. The first threshold and/or the second threshold can be based on the first segment duration parameter. The first threshold can be determined based on an upper bound scalar applied to the first segment duration parameter. For example, given a segment duration parameter of two seconds and an upper bound scalar of 1.5, the first threshold can be determined as 1.5*2 seconds=3 seconds. The second threshold can be determined based on a lower bound scalar applied to the first segment duration parameter. For example, given a segment duration parameter of two seconds and a lower bound scalar of 0.5, the second threshold can be determined as 0.5*2 seconds=1 second.

When the average segment duration exceeds the first threshold or falls below the second threshold, the transcoder 129 can encode one or more content segments based on a second segment duration parameter. Encoding the one or more content segments based on the second segment duration parameter can comprise modifying a Group of Pictures (GOP) or conditioning associated with the content segments. For example, if the average segment duration exceeds the first threshold, the transcoder 129 can encode one or more content segments at a second segment duration parameter lower than the average segment duration, thereby reducing the average segment duration over time. As another example, if the average segment duration falls below the second threshold, the transcoder 129 can encode one or more content segments at a second segment duration parameter greater than the average segment duration, thereby increasing the average segment duration over time.

The second segment duration parameter can be determined based on a minimum segment duration parameter establishing a minimum duration at which content segments can be encoded. The second segment duration parameter can be determined based on a maximum segment duration parameter establishing a maximum duration at which content segments can be encoded. The second segment duration parameter can be determined such that the average segment duration falls below the first threshold and/or exceeds the second threshold after encoding N number of segments, or at most N number of segments, at the second segment duration parameter.

The transcoder 129 can encode the one or more content segments based on the second segment duration parameter until the average segment duration falls below the first threshold, and/or exceeds the second threshold. The one or more content segments can be transmitted to the packager 130. After the average segment duration falls below the first threshold and/or exceeds the second threshold, the transcoder can encode one or more content segments based on the first segment duration parameter.

The network 116 can comprise a network component 131. The network component 131 can comprise any device, module, and/or the like communicatively coupled to the network 116. For example, the network component 131 can comprise a router, a switch, a splitter, a packager, a gateway, a encoder, a storage device, a multiplexer, a network access location (e.g., tap), physical link, and/or the like.

Figure 2:
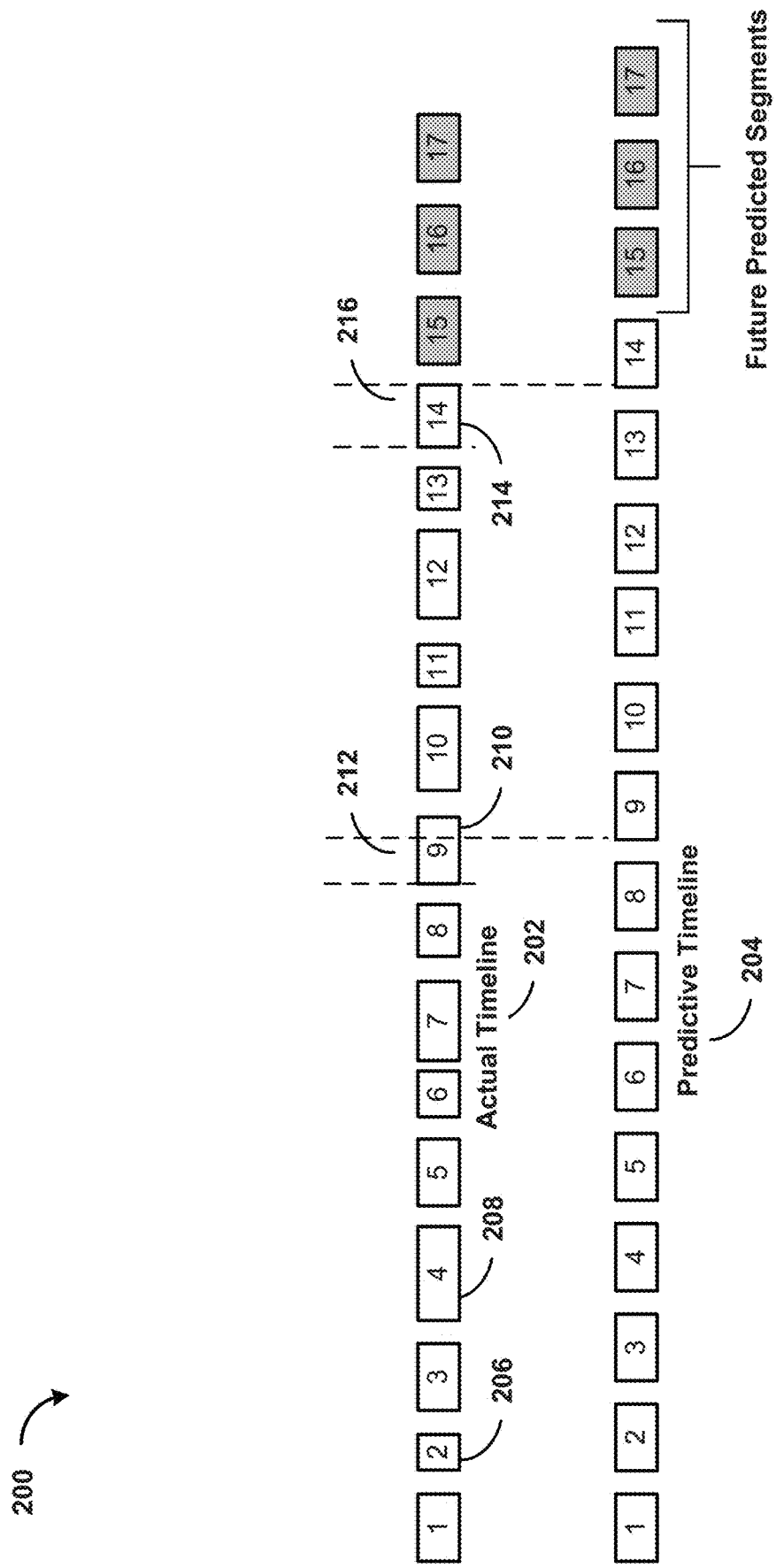
FIG. 2 is an example timeline content segment durations.

FIG. 2 is an example graph 200 of an actual timeline 202 of content segment durations relative to a predictive timeline 204 of content segment durations. Each entry in the actual timeline 202 and the predictive timeline 204 can correspond to a content segment. Each entry in the predictive timeline 204 can be generated according to a segment duration parameter. Thus, a start time for a given predictive timeline 204 entry can be expressed as an index-1 multiplied by the segment duration parameter. As shown, each entry of the predictive timeline 204 has a same duration corresponding to the segment duration parameter. In contrast, entries in the actual timeline 202 have varying durations. For example, a content segment 206 has a duration shorter than the segment duration parameter, while a content segment 208 has a duration greater than the segment duration.

Due to the variance between the actual timeline 202 and the predictive timeline 204, the actual start time of content segment 210 varies from its predicted start time by an amount represented by slip 212. An acceptable amount of slip can be correlated with a first threshold or a second threshold to which an average segment duration is compared. Thus, the first threshold and/or second threshold can be defined such that, when the slip falls outside acceptable margins, the average segment duration will fall above the first threshold or below the second threshold as set forth above, thereby triggering a transmission of a modified segment duration parameter to a user device.

For example, assume a segment duration parameter of two seconds. The predictive timeline 204 reflects predicted segment durations of two seconds throughout. However, as seen by the actual timeline 202, the durations of content segments can fall below two seconds, as shown by content segment 206, or exceed two seconds, as shown by content segment 208. Here, a slip 212 has accrued such the predicted start time for the content segment 210 falls within the duration of the content segment 210. For example, the slip 212 may equal 1.5 seconds. The predicted start time of a content segment can be calculated by multiplying the segment duration parameter by the index of a content segment minus one. So, the predicted start time for content segment 210 at index 9 would be (2*8), or 16 seconds. Assuming an actual start time of the content segment 210 at 14.5 seconds and an actual duration of two seconds, the predicted start time at 16 seconds falls within the duration of the content segment 210. The resulting slip 212 is 1.5 seconds. Thus, a modified segment duration parameter need not be transmitted to a user device.

As another example, the predicted start time of content segment 214 shown as index 14 would be at 26 seconds. However, content segment 214 can have an actual start time of 23.8 seconds and a two-second segment duration. Here, the slip 216 results in the predicted start time of content segment 214 falling outside of the duration of the content segment 214. Thus, a modified segment duration parameter needs to be transmitted to the user device.

Figure 3:
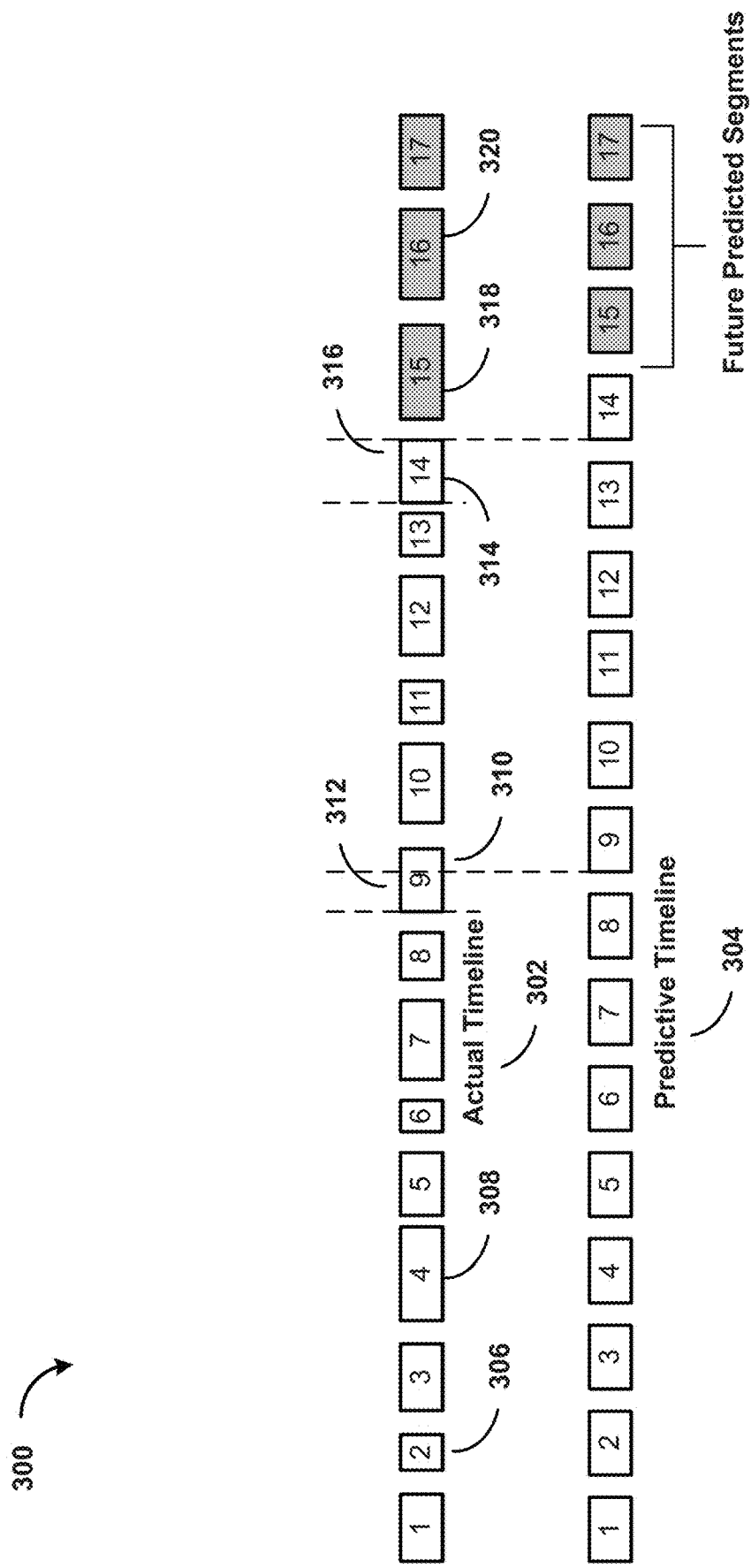
FIG. 3 is an example timeline of content segment durations.

FIG. 3 is an example graph 300 of an actual timeline 302 of content segment durations relative to a predictive timeline 304 of content segment durations. Each entry in the actual timeline 302 and the predictive timeline 304 can correspond to a content segment. Each entry in the predictive timeline 304 can be generated according to a segment duration parameter. Thus, a start time for a given predictive timeline 304 entry can be expressed as an index-1 multiplied by the segment duration parameter. As shown, each entry of the predictive timeline 304 has a same duration corresponding to the segment duration parameter. In contrast, entries in the actual timeline 302 have varying durations. For example, content segment 306 has a duration shorter than the segment duration parameter, while content segment 308 has a duration greater than the segment duration.

Due to the variance between the actual timeline 302 and the predictive timeline 304, the actual start time of content segment 310 varies from its predicted start time by an amount represented by slip 312. An acceptable amount of slip can be correlated with a first threshold or a second threshold to which an average segment duration is compared. Thus, the first threshold and/or the second threshold can be defined such that, when the slip falls outside acceptable margins, the average segment duration will fall above the first threshold or below the second threshold as set forth above. As shown by content segment 314, a size of the slip 316 will be reflected in the average segment duration falling above a first threshold or below a second threshold. In an aspect, a transcoder 130 can generate content segments 318 and 320 at durations greater than the segment duration parameter in order to bring the average segment duration within the first and second thresholds.

For example, assume a segment duration parameter of two seconds. Each entry in the predictive timeline 304 assumes that each content segment will conform to this two second segment duration. However, as seen by the actual timeline 302, the durations of content segments as encoded by the transcoder can fall below two seconds, as shown by content segment 306, or exceed two seconds, as shown by content segment 308. Here, a slip 312 has accrued such the predicted start time for the content segment 310 falls within the duration of the content segment 310. For example, the slip 312 may equal 1.5 seconds. The predicted start time of a content segment can be calculated by multiplying the segment duration parameter by the index of a content segment minus one. So, the predicted start time for content segment 310 at index 9 would be (2*8), or 16 seconds. Assuming an actual start time of the content segment 310 at 14.5 seconds and an actual duration of two seconds, the predicted start time at 16 seconds falls within the duration of the content segment 310. The resulting slip 312 is 1.5 seconds. Thus, a transcoder need not change the segment duration parameter at which content segments are encoded.

As another example, the predicted start time of content segment 314 shown as index 14 would be at 26 seconds, However, content segment 214 can have an actual start time of 23.8 seconds and a two-second segment duration. Here, the slip 216 results in the predicted start time of content segment 214 falling outside of the duration of the content segment 214. In response, the transcoder encodes content segments 318 and 320 according to an increased segment duration parameter, e.g. three seconds, such that their corresponding predicted start times fall within the durations of the content segments 318 and 320.

Figure 4:
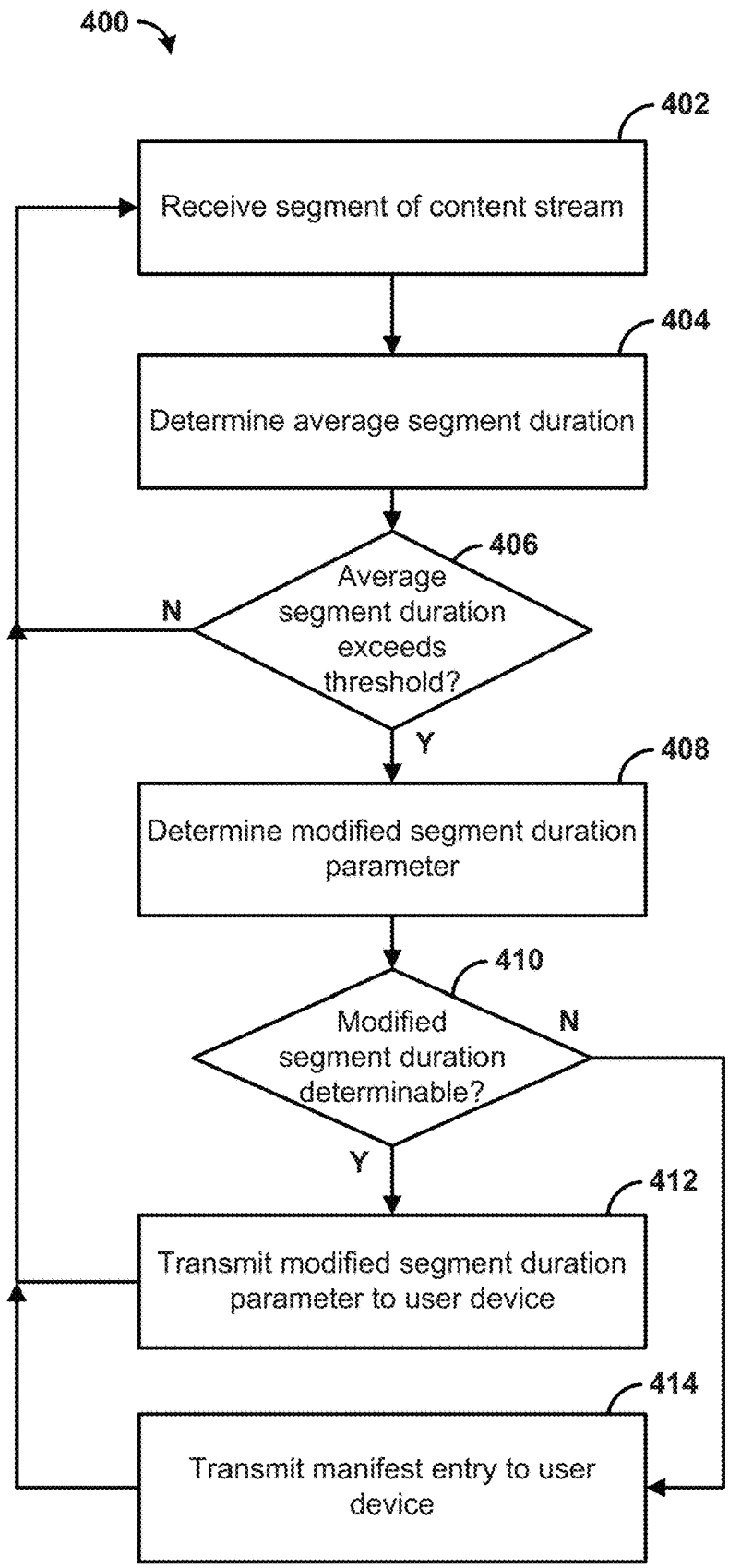
FIG. 4 is a flowchart of an example method.

FIG. 4 is a flowchart 400 of an example method. Beginning with step 402, content segments for a content stream can be received. For example, the content segments can be received by a packager 130. The content segments can be received from a transcoder that encodes the content segments. In step 404, an average of the durations of the received content segments can be determined. For example, the average of the durations of the received content segments can be determined by the packager 130. The received content segments can correspond to a period element or other entry of a manifest of the content stream. The average segment duration can be determined relative to content segments in the period element. The average segment duration can be determined relative to a segment element of a manifest for the content stream. The manifest can comprise a manifest template defining one or more parameters upon which a request for a content segment can by dynamically generated. Thus, the average segment duration can be determined based on the received content segments corresponding to and/or occurring sequentially after the segment element in the manifest.

It can be determined, e.g., by a packager 130, whether the average segment duration exceeds a first threshold value. The first threshold value can be based on a segment duration parameter of a manifest template. The first threshold can be defined by a scalar value multiplied by the segment duration parameter. For example, given a segment duration parameter, the first threshold can be defined as 1.5*2 seconds=3 seconds. If the average segment duration falls below the first threshold value, the method can return to step 402 where additional content segments can be received. If the average duration exceeds the first threshold value, the method can advance to step 408 where a modified segment duration parameter can be determined.

For example, the modified segment duration parameter can be determined by determining or maintaining a minimum and maximum segment duration for the received content segments. Determining the modified segment duration parameter can comprise determining the modified segment duration parameter such that the following equation is satisfied:

$$S_1 * SD_{new} < SD_{min} < SD_{max} < S_2 * SD_{new}$$

where $S_1$ is a lower bound scalar (e.g., 0.5), $S_2$ is an upper bound scalar (e.g. 1.5). $SD_{min}$ is a minimum segment duration for received content segments, $SD_{max}$ is a maximum segment duration for received content segments, and $SD_{new}$ is the modified segment duration parameter.

In step 410 it can be determined, e.g., by a packager 130, whether a modified segment duration parameter was determined in step 408. For example, it can be determined whether a segment duration parameter was determined that can satisfy an equation for determining the segment duration parameter. If the modified segment duration parameter was determined in step 408, the method can advance to step 412 where the modified segment duration parameter can be transmitted to a user device. For example, the packager 130 can transmit the modified segment duration parameter to the user device. Transmitting the modified segment duration can comprise generating a manifest comprising the modified segment duration parameter as a parameter of a manifest template and transmitting the generated manifest to the user device. In another aspect, transmitting the modified segment duration parameter can comprise generating a manifest update comprising a delta or change to be applied to a manifest stored on the user device. The manifest update can then be transmitted to the user device. After transmitting the modified segment duration parameter to the user device in step 412, the process returns to step 402.

If, in step 410 it is determined that a modified segment duration parameter was not determined, e.g., a modified segment duration parameter $SD_{new}$ cannot be calculated to satisfy the above equation or another parameter, the method can advance to step 414 where a new manifest entry can be transmitted to the user device. For example, a packager 130 can transmit the new manifest entry to the user device. The new manifest entry can comprise a new segment entry or new period entry. Determining the average segment duration as set forth in step 404 can be reset in response to transmitting the modified segment duration parameter to the user device. Thus, the average segment duration will reflect the duration of content segments transmitted after the modified segment duration parameter. Transmitting the new manifest entry can include transmitting an updated manifest comprising the new period element or segment element. Transmitting the new manifest entry can comprise transmitting a manifest update, delta, or differential including the new manifest entry to be applied to a manifest stored on the user device. After transmitting the new manifest entry, the method can return to step 402.

Figure 5:
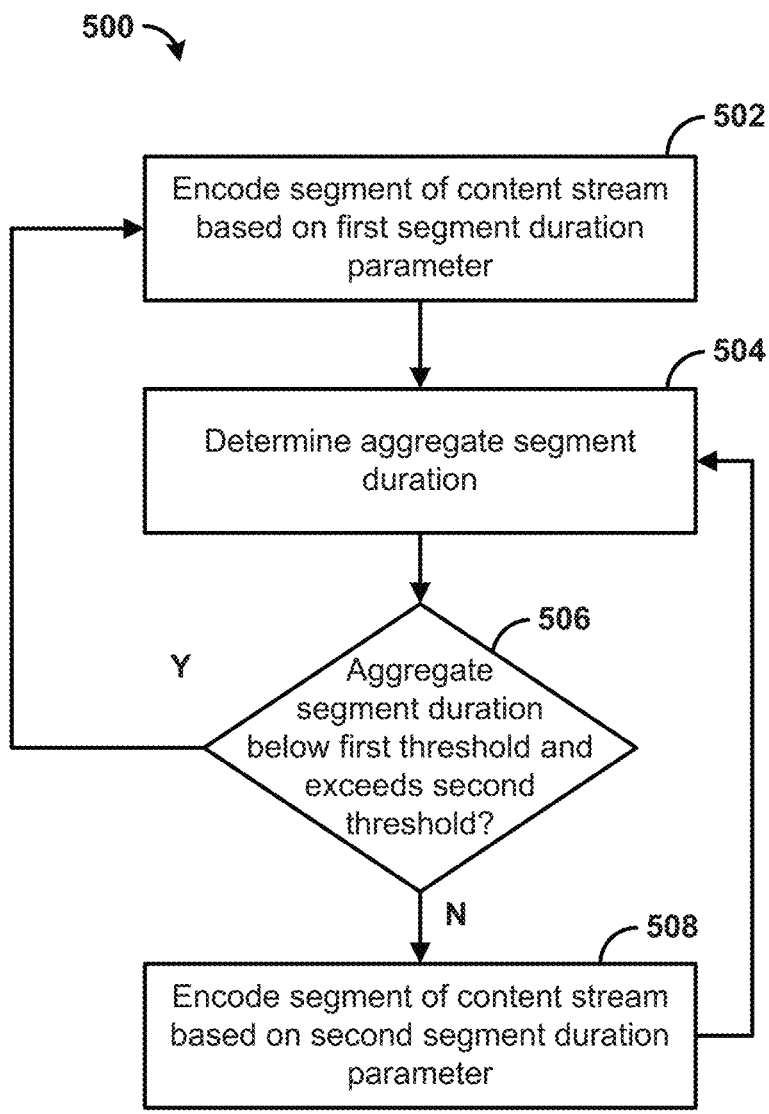
FIG. 5 is a flowchart of an example method.

FIG. 5 is a flowchart 500 of an example method. Beginning with step 502, a content segment of a content stream can be encoded based on a first segment duration parameter. For example, the content segment can be encoded based on the first segment duration parameter by a transcoder 129. The first segment duration parameter can comprise a duration in time at which segment durations are to be encoded. Thus, the transcoder 129 can modify a bit rate, timing information, or other parameters of a given content segment during encoding to conform to the first segment duration parameter. The first segment duration parameter can correspond to a segment duration parameter included in a manifest stored on a user device receiving the content stream. In step 504, an aggregate segment duration for encoded content segments can be determined. For example, determining the aggregate segment duration parameter can be determined by the transcoder 129. The aggregate segment duration can comprise an average duration for content segments encoded by the transcoder 129 for a given content stream. The aggregate segment duration can comprise an average duration for another grouping of content segments. The aggregate segment duration can comprise a means-squared value for one or more durations of content segments.

In step 506, it can be determined whether the aggregate segment duration falls below a first threshold and exceeds a second threshold. For example, the transcoder 129 can determine whether the aggregate segment duration falls below the first threshold and exceeds the second threshold. The first threshold and/or the second threshold can be based on the first segment duration parameter. The first threshold can be determined based on an upper bound scalar applied to the first segment duration parameter. For example, assume an upper bound scalar of 1.5 and a two-second first segment duration parameter. The first threshold can be determined as 1.5*2=three seconds. The second threshold can be determined based on a lower bound scalar applied to the first segment duration parameter. For example, assume a lower bound scalar of 0.5 and a two-second first segment duration parameter. The second threshold can be determined as 0.5*2=one second.

When the aggregate segment duration falls below the first threshold and above the second threshold, the method can return to step 502. When the aggregate segment duration exceeds the first threshold or below the second threshold, the process can advance to step 508 where one or more content segments of the content stream can be encoded based on a second segment duration parameter. The one or more content segments can be encoded based on the second segment duration parameter by the transcoder 129. For example, if the aggregate segment duration exceeds the first threshold one or more content segments can be encoded at a second segment duration parameter lower than the aggregate segment duration, thereby reducing the aggregate segment duration over time. As another example, if the aggregate segment duration falls below the second threshold, the one or more content segments can be encoded at a second segment duration parameter greater than the aggregate segment duration, thereby increasing the aggregate segment duration over time.

The second segment duration parameter can be determined, e.g., by the transcoder 129, based on a minimum segment duration parameter establishing a minimum duration at which content segments can be encoded. For example, the second segment duration parameter can be determined based on a maximum segment duration parameter establishing a maximum duration at which content segments can be encoded. As another example, the second segment duration parameter can be determined such that the aggregate segment duration falls below the first threshold or above the second threshold after encoding N number of segments, or at most N number of segments, at the second segment duration.

After encoding the one or more content segments of the content stream based on the second segment duration parameter, the process can return to step 504. Thus, content segments can be repeatedly encoded based on the second segment duration parameter until the aggregate segment duration falls below the first threshold and above the second threshold as determined in step 506. Once the aggregate segment duration falls below the first threshold and above the second threshold, content segments can be encoded based on the first segment duration parameter as described in step 502.

Figure 6:
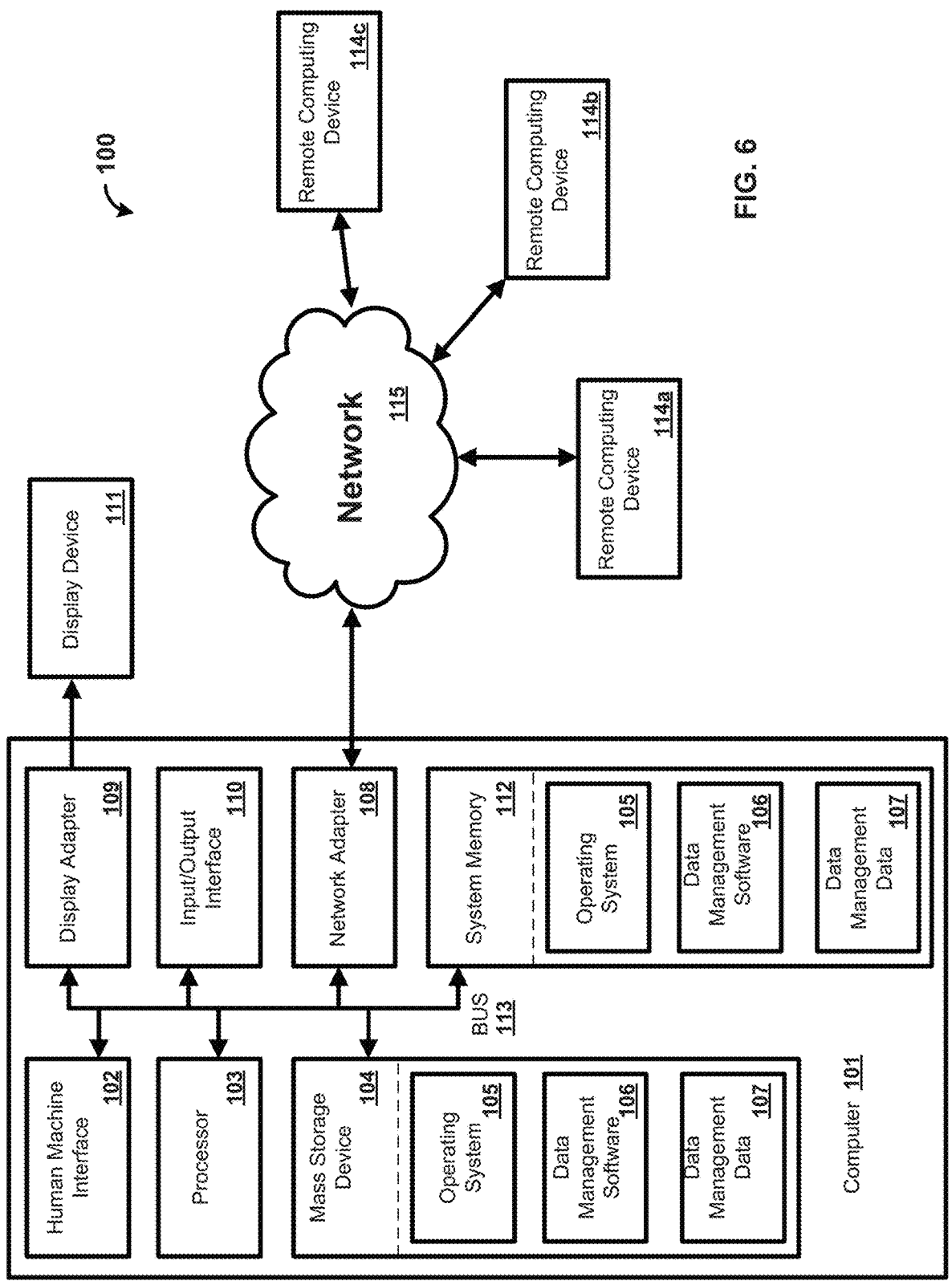
FIG. 6 is a block diagram of a computing device.

In an exemplary aspect, the methods and systems can be implemented on a computer 601 as illustrated in FIG. 6 and described below. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 613, and all buses specified in this description can also be implemented over a wired or wireless network connection and each of the subsystems, including the one or more processors 603, a mass storage device 604, an operating system 605, content software 606, content data 607, a network adapter 608, the system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content data 607 and/or program modules such as the operating system

605 and the content software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the content software 606. Each of the operating system 605 and the content software 606 (or some combination thereof) can comprise elements of the programming and the content software 606. The content data 607 can also be stored on the mass storage device 604. The content data 607 can be stored in any of one or more databases known in the art. Examples of such databases comprise, DB2®, Microsoft® Access, Microsoft® SQL Server, Oracle®, my SQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the content software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and. evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, based on a duration of each content segment of a plurality of content segments, that an average content segment duration exceeds a first threshold;
   based on the average content segment duration exceeding the first threshold, determining a modified content segment duration parameter configured to cause a subsequent average content segment duration to not exceed the first threshold; and
   sending, to a user device, a manifest comprising the modified content segment duration parameter.

2. The method of claim 1, further comprising modifying, based on the modified content segment duration parameter, the first threshold.

3. The method of claim 1, further comprising determining, based on a minimum segment duration of the plurality of content segments and a maximum segment duration of the plurality of content segments, the modified content segment duration parameter.

4. The method of claim 3, wherein determining the modified content segment duration parameter comprises determining the modified content segment duration parameter such that the minimum segment duration and the maximum segment duration are both within a range based on: the modified content segment duration parameter, an upper bound scalar applied to the modified content segment duration parameter, and a lower bound scalar applied to the modified content segment duration parameter.

5. The method of claim 4, further comprising generating, in response to the modified content segment duration parameter being unable to be determined, the manifest, wherein the manifest comprises a segment element or a period element instead of the modified content segment duration parameter.

6. The method of claim 1, further comprising generating the manifest based on a manifest template, wherein the manifest template comprises the modified content segment duration parameter.

7. The method of claim 1, further comprising:
   determining that the average content segment duration is below a second threshold; and
   generating, based on determining that the average content segment duration is below the second threshold, a second manifest comprising a second modified content segment duration parameter.

8. The method of claim 7, further comprising modifying, based on the modified content segment duration parameter, the second threshold.

9. A method comprising:
   encoding, based on a first content segment duration parameter, a plurality of first content segments;
   sending, to a content packaging device, the plurality of first content segments;
   determining an aggregate content segment duration of the plurality of first content segments satisfies a first threshold; and
   based on the aggregate content segment duration satisfying the first threshold, sending to a user device, a manifest file comprising a modified content segment duration parameter configured to cause a subsequent aggregate content segment duration to not exceed the first threshold.

10. The method of claim 9, further comprising modifying, based on the modified content segment duration parameter, the first threshold to a second threshold.

11. The method of claim 9, wherein the aggregate content segment duration comprises at least one of an average segment duration or a means-squared segment duration.

12. An apparatus comprising:
    one or more processors; and
    a memory storing processor-executable instructions that, when executed by the one or more processors, cause the apparatus to:
       determine, based on a duration of each content segment of a plurality of content segments, an average content segment duration exceeds a first threshold;
       based on the average content segment duration exceeding the first threshold, determine a modified content segment duration parameter configured to cause a subsequent average content segment duration to not exceed the first threshold; and
       send, to a user device, a manifest comprising the modified content segment duration parameter.

13. The apparatus of claim 12, wherein the processor-executable instructions, when executed by the one or more processors, further cause the apparatus to modify, based on the modified content segment duration parameter, the first threshold.

14. The apparatus of claim 12, wherein the processor-executable instructions, when executed by the one or more processors, further cause the apparatus to determine, based on a minimum segment duration of the plurality of content segments and a maximum segment duration of the plurality of content segments, the modified content segment duration parameter.

15. The apparatus of claim 14, wherein the processor-executable instructions that cause the apparatus to determine the modified content segment duration parameter further cause the apparatus to determine the modified content segment duration parameter such that the minimum segment duration and the maximum segment duration both are within a range based on: the modified content segment duration parameter, an upper bound scalar applied to the modified content segment duration parameter, and a lower bound scalar applied to the modified content segment duration parameter.

16. The apparatus of claim 15, wherein the processor-executable instructions, when executed by the one or more processors, further cause the apparatus to generate the manifest in response to the modified content segment duration parameter being unable to be determined, wherein the manifest comprises a segment element or a period element instead of the modified content segment duration parameter.

17. The apparatus of claim 12, wherein the processor-executable instructions, when executed by the one or more processors, further cause the apparatus to generate the manifest based on a manifest template, wherein the manifest template comprises the modified content segment duration parameter.

18. The apparatus of claim 12, wherein the processor-executable instructions, when executed by the one or more processors, further cause the apparatus to:
determine that the average content segment duration does not satisfy a second threshold; and
generate, based on determining that the average content segment duration not satisfying the second threshold, another manifest comprising another modified content segment duration parameter.

19. The apparatus of claim 18, wherein the processor-executable instructions, when executed by the one or more processors, further cause the apparatus to modify, based on the modified content segment duration parameter, the second threshold.

20. An apparatus comprising:
one or more processors; and
a memory storing processor-executable instructions that, when executed by the one or more processors, cause the apparatus to:
  encode, based on a first content segment duration parameter, a plurality of first content segments;
  send, to a content packaging device, the plurality of first content segments;
  determine an aggregate content segment duration of the plurality of first content segments satisfies a first threshold; and
  based on the aggregate content segment duration satisfying the first threshold, send, to a user device, a manifest file comprising a modified content segment duration parameter configured to cause a subsequent aggregate content segment duration to not exceed the first threshold.

21. The apparatus of claim 20, wherein the processor-executable instructions, when executed by the one or more processors, further cause the apparatus to modify, based on the modified content segment duration parameter, the first threshold to a second threshold.

22. The apparatus of claim 20, wherein the aggregate content segment duration comprises at least one of an average segment duration or a means-squared segment duration.

23. The method of claim 1, further comprising:
determining, based on one or more subsequent content segments encoded according to the modified content segment duration parameter, the subsequent average content segment duration; and
comparing the subsequent average content segment duration to the first threshold.

24. The method of claim 9, further comprising:
determining, based on one or more subsequent content segments encoded according to the modified content segment duration parameter, the subsequent aggregate content segment duration; and
comparing the subsequent aggregate content segment duration to the first threshold.

25. The apparatus of claim 12, wherein the processor-executable instructions, when executed by the one or more processors, further cause the apparatus to:
determine, based on one or more subsequent content segments encoded according to the modified content segment duration parameter, the subsequent average content segment duration; and
compare the subsequent average content segment duration to the first threshold.

26. The apparatus of claim 20, wherein the processor-executable instructions, when executed by the one or more processors, further cause the apparatus to:
determine, based on one or more subsequent content segments encoded according to the modified content segment duration parameter, the subsequent aggregate content segment duration; and
compare the subsequent aggregate content segment duration to the first threshold.

* * * * *